United States Patent [19]

Paddington

[11] Patent Number: 4,553,777
[45] Date of Patent: Nov. 19, 1985

[54] PIPE COUPLERS

[76] Inventor: Arthur L. Paddington, 8 Glenside, Whitstable, Kent, England, CT5 3DT

[21] Appl. No.: 482,784

[22] Filed: Apr. 7, 1983

[30] Foreign Application Priority Data

Apr. 15, 1982 [GB] United Kingdom ............... 8210954

[51] Int. Cl.⁴ .............................................. F16L 25/00
[52] U.S. Cl. .................................. 285/420; 285/364; 285/406; 285/177
[58] Field of Search ................. 285/420, 364, 406, 12, 285/177

[56] References Cited

U.S. PATENT DOCUMENTS

| | | | |
|---|---|---|---|
| 2,645,506 | 7/1953 | Sturgis | 285/364 X |
| 3,558,161 | 1/1971 | Bormioli | 285/406 X |
| 3,586,350 | 6/1971 | Ashton | 285/420 X |
| 3,695,635 | 10/1972 | Paddington | 285/420 X |
| 4,113,283 | 9/1978 | Curtis et al. | 285/364 X |
| 4,202,567 | 5/1980 | Paddington | 285/364 X |

Primary Examiner—Richard J. Scanlan, Jr.
Attorney, Agent, or Firm—Cantor and Lessler

[57] ABSTRACT

A coupler for coupling together two pipes comprises a substantially cylindrical body on which a plurality of hook arms carrying latches are pivotally mounted. An actuator ring is rotatably mounted on the coupler body and has a cam surface which is arranged to cause the hook arms to pivot to move the latches into and out of a position in which they serve to lock a flange at the end of a pipe to a front flange of the cylindrical body. The pipe flange can be guided onto the coupling by guides and the guides are also effective to hold adaptor plates on the flange so that the coupler can be used to couple pipes of different diameters. No axial movement of any of the components of the coupler takes place during coupling, movement of the actuator ring being purely rotational and movement of the hook arms and latches being purely pivotal.

10 Claims, 23 Drawing Figures

PIPE COUPLERS

BACKGROUND OF THE INVENTION

This invention relates to a coupler for coupling together two pipes. The invention is particularly applicable to the coupling of a tanker vessel loading or discharge pipe to an offshore installation or a shore-mounted pipe, for example a pipe mounted on a jetty. However, the coupler could be used in other contexts where two pipes are to be releasably coupled together.

Existing pipe couplers are usually heavy and expensive and nearly always involve axial movement of the coupling mechanism which can be a considerable disadvantage. A further disadvantage of the known couplers is that they are not readily adaptable for use in coupling pipes having different diameters.

SUMMARY OF THE INVENTION

The present invention aims to provide a pipe coupler which overcomes the above-mentioned disadvantages and which can be used to couple pipes having different diameters.

According to the present invention, there is provided a coupler for coupling two pipes, which comprises a plurality of pivotally mounted hook arms and an actuator ring which is capable of rotation to pivot the hook arms into and out of a pipe-coupling position, said coupler further comprising a substantially cylindrical body on which the hook arms and actuator ring are mounted, wherein the actuator ring is provided with a cam track arranged to cause the hook arms to pivot into and out of a position in which they serve to lock a flange at the end of a pipe to said substantially cylindrical body, and wherein the cam track and the hook arms are so configured that frictional forces therebetween are capable of locking the hook arms against vibration when used with varying thicknesses of flanges and without the provision of any other movable clamping means.

The invention also provides a coupler for coupling together two pipes, which comprises a plurality of pivotally mounted hook arms and an actuator ring which is capable of rotation to pivot the hook arms into and out of a pipe-coupling position, said coupler further comprising a substantially cylindrical body on which the hook arms and actuator ring are mounted and the actuator ring being provided with a cam track arranged to cause the hook arms to pivot into and out of a position in which they serve to lock a flange at the end of a pipe to said substantially cylindrical body, in which the cam track has a final part which is formed by a locking block having a surface across the cam track which has a changing angle which provides a contact surface with the hook arms throughout the final pivoting movement thereof and hence serves to maintain a locking action on the hook arms as the actuator ring is rotated to the end of its travel. Preferably, the said surface of the locking block is arranged to give the hook arms a positive lock over the last 10° of movement as the actuator ring is rotated.

The body is preferably provided with a plurality of manifold guides for guiding a pipe flange into a coupling position. These guides can also be used to hold an adaptor plate to a front flange of the body so that the coupler can be used for coupling pipes of different diameters.

BRIEF DESCRIPTION OF THE DRAWINGS

The invention will now be further described, by way of example, with reference to the drawings, in which.

In the drawings, like parts are denoted by like reference numerals.

DESCRIPTION OF PREFERRED EMBODIMENTS

Figure 1:
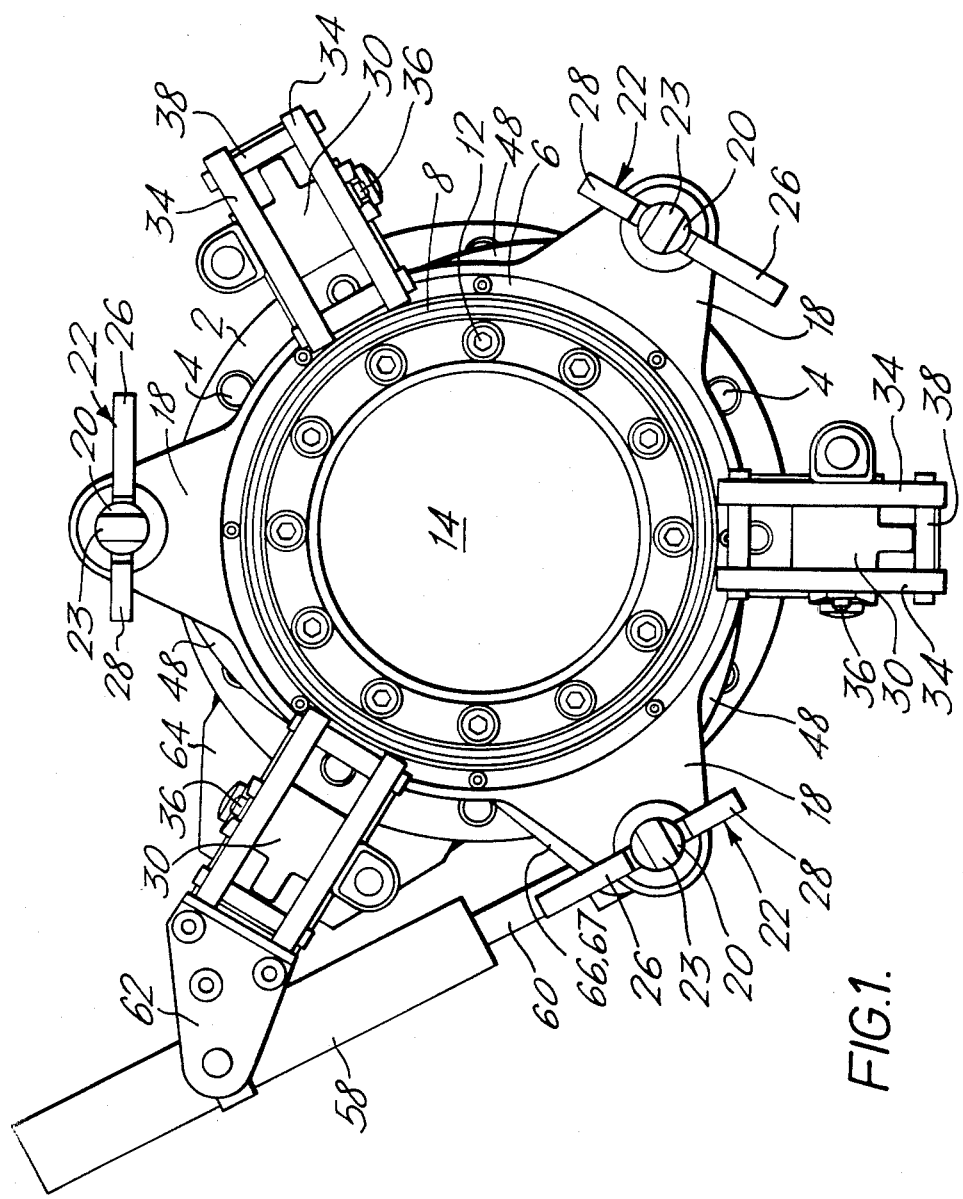
FIG. 1 is a front view of one embodiment of a coupler according to the invention.
Figure 2:
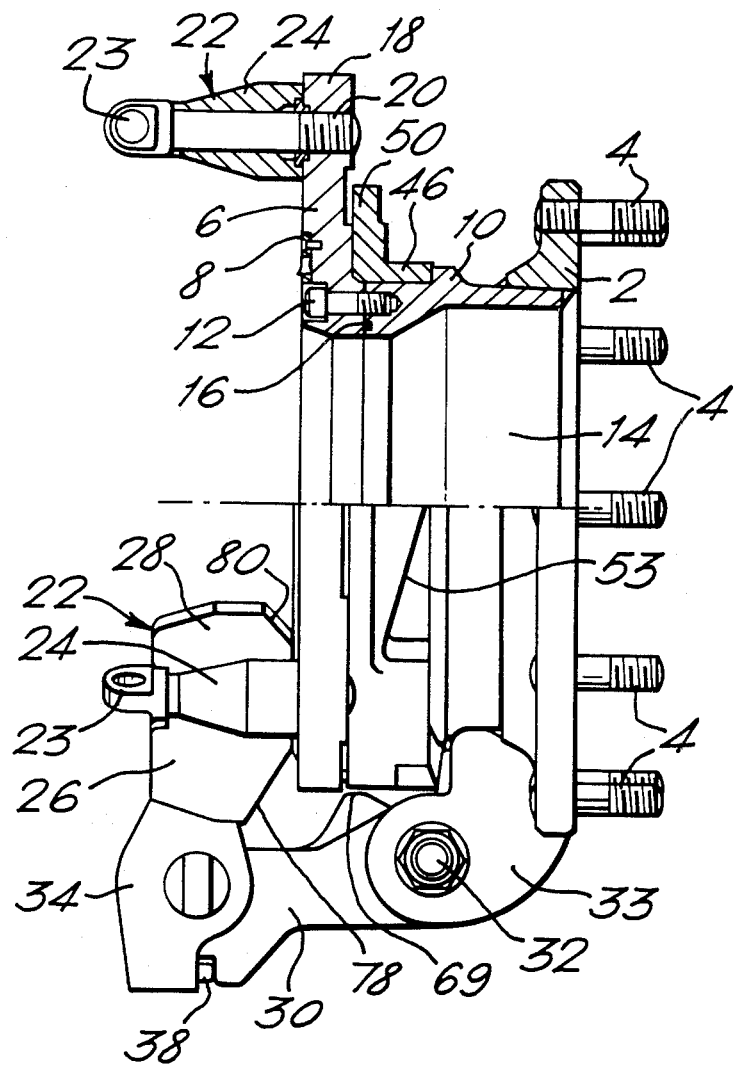
FIG. 2 is a part-sectional side view of the coupler shown in FIG. 1.

Referring first to FIGS. 1 and 2, the coupler comprises a rear flange 2 which is connected to a flange of a first pipe (not shown) by means of studs 4. On its opposite face the coupler has a front flange 6, which, in use, contacts the face of a flange of a second pipe. This contact is shown in FIGS. 6 to 9, and is described in more detail below with reference to those Figures. To prevent leakage between the flange 6 and the flange of the second pipe, the flange 6 is provided with a face seal 8. A generally cylindrical member 10 extends forwardly from the rear flange 2 and the front flange 6 is secured thereto by cap screws 12. The cylindrical member 10 serves to define a passage 14 for fluid to pass from the first pipe to the second pipe or vice versa. Sealing between the front flange 6 and the cylindrical member 10 is provided by an O-ring 16.

Figure 6:
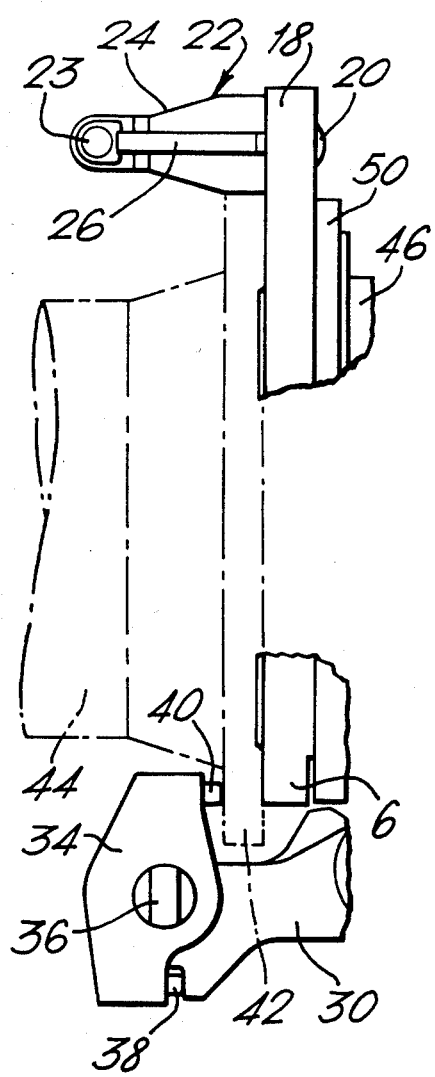
FIG. 6 shows the coupler used to connect a pipe having a flange of 12 inches diameter.
Figure 7:
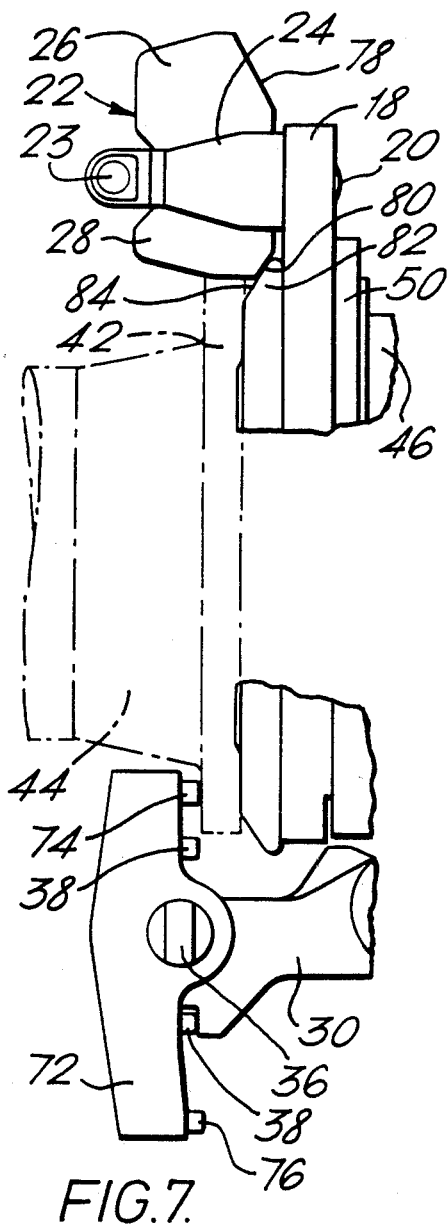
FIG. 7 shows the coupler used to connect to a pipe having a flange of 10 inches diameter.
Figure 8:
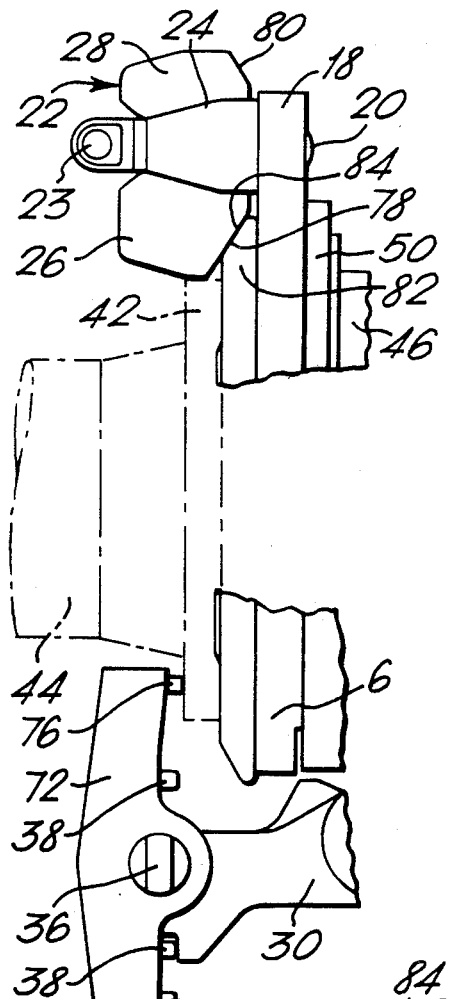
FIG. 8 shows the coupler used to connect to a pipe having a flange of 8 inches diameter.
Figure 9:
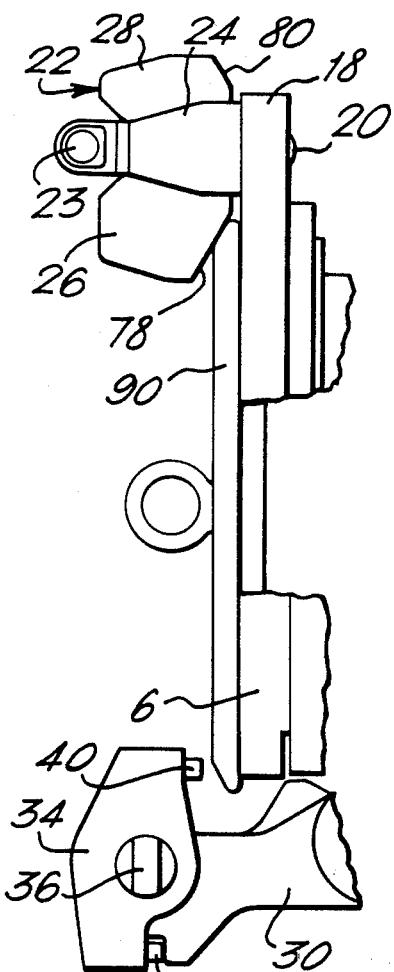
FIG. 9 shows how the coupler may be blanked off when disconnected.

Three approximately triangular tabs 18 extend from the periphery of the front flange 6 at locations spaced by 120° from one another. Each of these tabs has a pin 20 passing therethrough, the pin 20 carrying a manifold guide 22. By slackening the pin 20 the manifold guide 22 can be rotated about the pin. The manifold guide has an eye 23 on the end thereof through which a bar can be passed for an operator to use in carrying out this rotation. The effect of this rotation can be seen by comparing FIGS. 6, 7, 8 and 9. FIG. 6 shows the manifold guide in a first position, FIG. 7 shows the manifold guide in a second position in which it has been rotated in one direction through 90° with respect to the first position, and FIGS. 8 and 9 show the manifold guide in a third position in which it has been rotated in the opposite direction through 90° with respect to the position of FIG. 6. From FIGS. 6 to 9 it can be seen that the manifold guide 22 comprises a generally conical member 24 from which two wings 26 and 28 extend radially in diametrically opposite directions. The wings are of equal thickness, but wing 26 is of greater radial extent than wing 28. Each wing 26 has a bevel surface 78 facing towards the associated tab 18 while each wing 28 has a bevel surface 80 similarly facing towards the associated tab 18.

Around the coupler, at locations midway between adjacent tabs 18, are three hook arms which serve to connect a pipe flange to the coupler. It will be appreciated that although three hook arms are shown there could be more arms if desired. These will now be described with reference to FIGS. 1, 2, 6 and 11. FIGS. 1 and 2, like FIG. 6, show the coupler in the form in which it couples a pipe having a 305 mm (12 inch) diameter flange. The hook arms are denoted by reference numeral 30, and can be seen from FIG. 2 to be mounted for pivotal movement about an axis 32. The axis 32 is defined by a nut and bolt arrangement provided with a suitable bush and washer. Preferably the bush is a self-lubricating bush. The bolt passes through a pair of side plates 33 which are mounted on the rear flange 2 and which form a mounting for the bolt and between which the hook arm 30 pivots. At its forward end each hook arm carries an adaptor latch 34 which is pivotally mounted thereon by a latch pin 36. The adaptor latch 34 carriers a pair of protrusions 38 and 40, the protrusion 38 bearing against a surface of the hook arm 30, and the protrusion 40 bearing against a flange 42 of a pipe 44 which is to be coupled.

Figure 3:
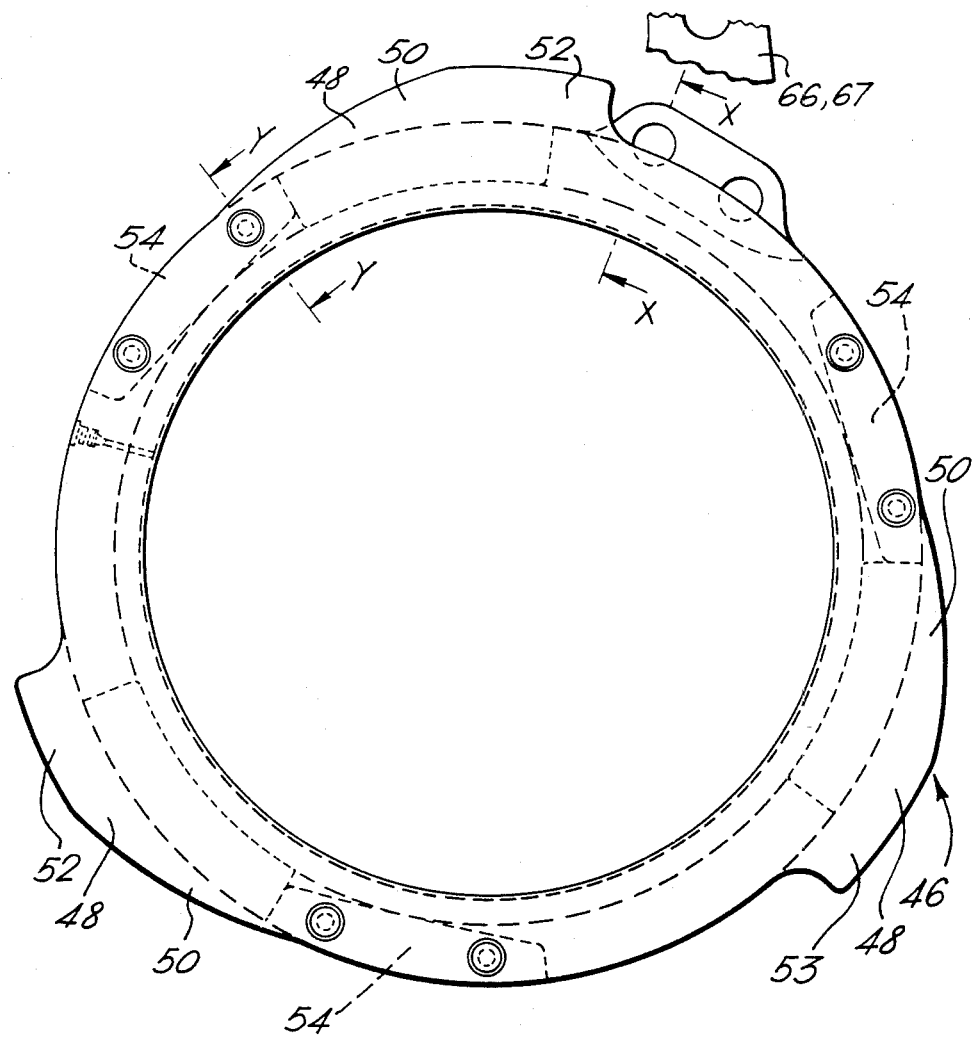
FIG. 3 is a front view of an actuator ring assembly which forms part of the coupler according to the invention.

The hook arms 30 are actuated by an actuator ring 46. It is to be noted that the actuator ring 46 is situated in front of the hook arm axis 32, i.e. between that axis and the face seal 8, a fact which helps reduce the size, and hence the weight, of the coupler. FIG. 3 shows a plan view of the actuator ring. From FIG. 3 it can be seen that the actuator ring has three cam portions 48 on the circumference thereof. Each cam portion 48 has a rising section 50 followed by a section 52 of constant diameter. The cam portions 48 are arranged equidistantly from one another around the circumference of the actuator ring.

Figure 3A:
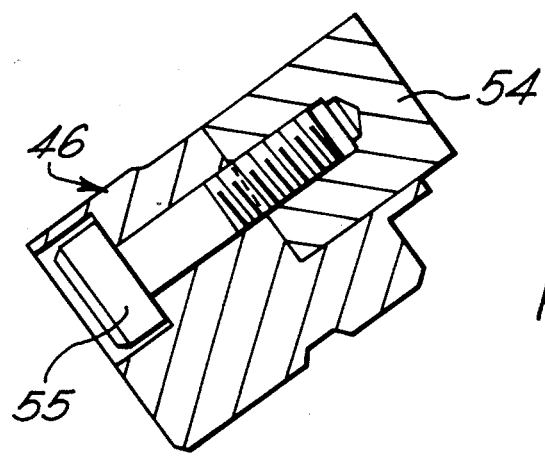
FIG. 3a is a section taken on the line Y—Y in FIG. 3 in the direction of the arrows.
Figure 12:
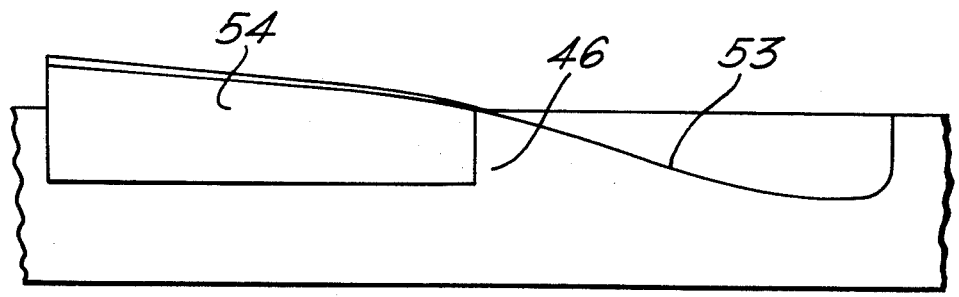
FIG. 12 shows part of a cam track provided on the back face of the actuator ring shown in FIG. 3, the track being projected, for the purposes of illustration, on a flat plane.

On its rear face the actuator ring 46 has further cam surfaces 53. One of these cam surfaces is shown in detail in FIG. 12 from which it can be seen that part of the cam surface is defined by a locking face block 54 which is secured to the actuator ring by means of cap screws 55 (see FIG. 3a). The part of the cam face 53 not defined by the locking face block can also be seen in FIG. 2. The cam face 53 visible in FIG. 2 is that which acts on the hook arm located 120° anti-clockwise (as viewed in FIG. 1) from the hook arm shown in FIG. 2.

Figure 5:
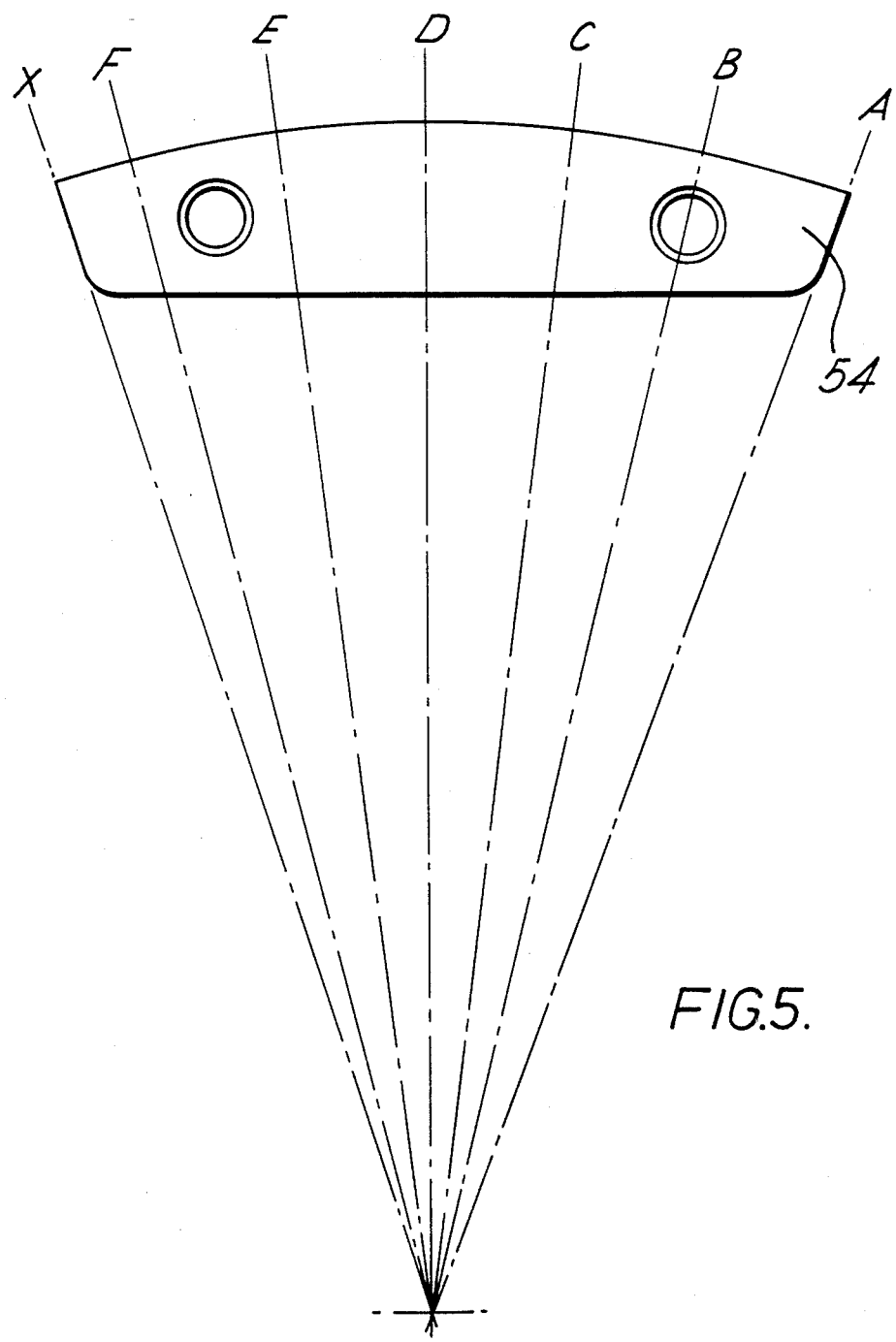
FIG. 5 is a front view of a locking face block forming part of the actuator ring assembly.
Figure 5A:
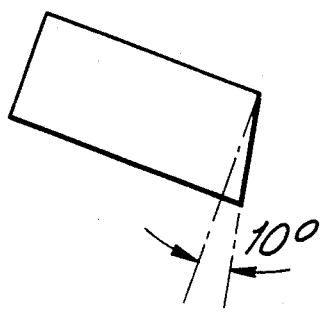
FIGS. 5A and 5F are sections taken on the lines A to F respectively in FIG. 5.
Figure 5B:
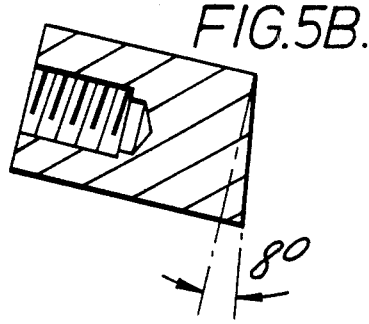
FIG. 5X is an end view on the line X of FIG. 5.
Figure 5C:
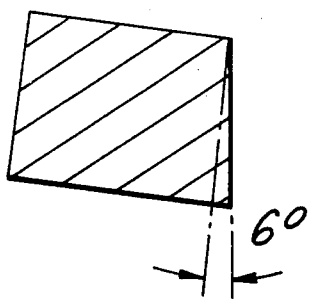
Figure 5D:
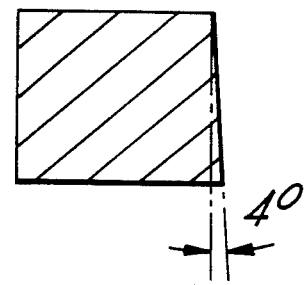
Figure 5E:
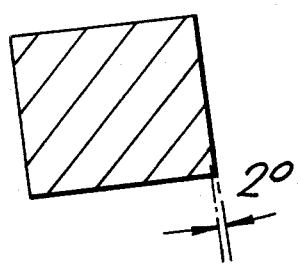
Figure 5F:
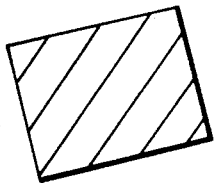
Figure 5X:
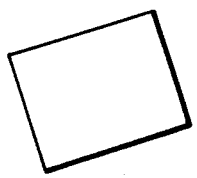
Figure 11:
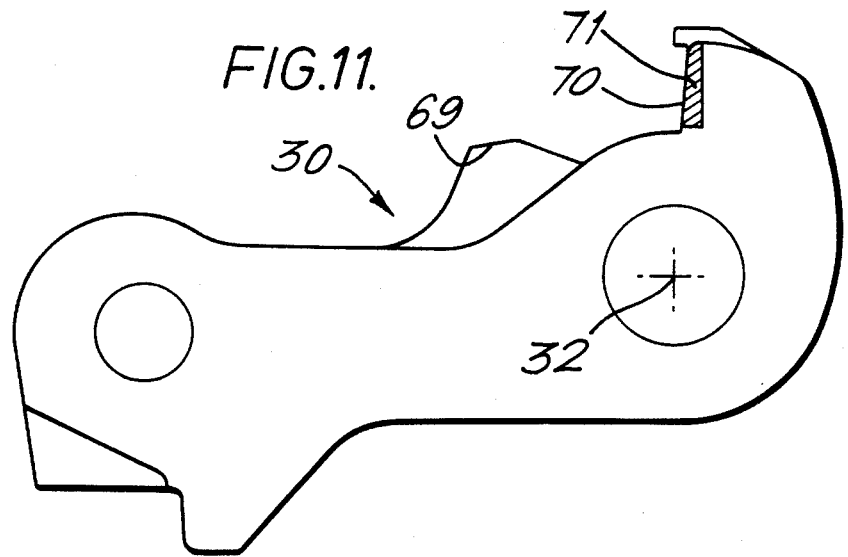
FIG. 11 shows one of the hook arms forming part of the coupler.

The shape of the locking face block can be seen most clearly by referring to FIG. 5 and FIGS. 5A to 5X, and to FIG. 11. From FIGS. 5A to 5X, which are cross sections and an end view, it can be seen that the back face of the locking face block is curved and that the angle between the front and back faces varies along the length of the block between 0° and 10°. It will be seen that at a point midway along the length of the block the angle between the front and back faces is 4° (see also FIG. 2).

Figure 4:
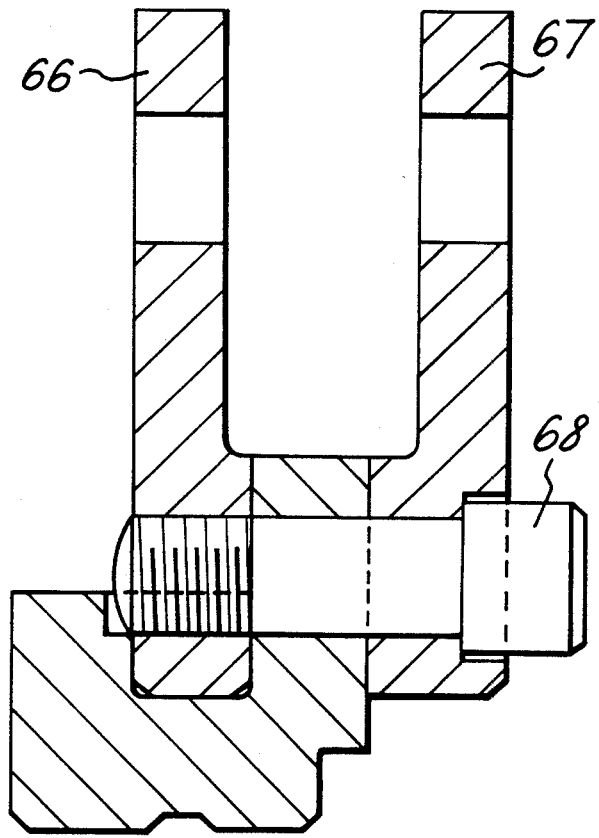
FIG. 4 is a section taken on the line X—X in FIG. 3 in the direction of the arrows.

The actuator ring is rotatable through an angle of 60° between a pipe-engaging position and a pipe-disengaging position, though some other angle, say between 30° and 90° could be used in alternative designs. This rotation is achieved by means of a hydraulic cylinder 58 having a piston rod 60. The cylinder 58 is pivotally connected to a pair of mounting plates 62, which are in turn connected to a plate 64 which is in turn fixed to the rear flange assembly 2. The piston rod is connected to the actuator ring 46 by means of an assembly shown in FIG. 4. This comprises a pair of arms 66 and 67 which are connected to the piston rod 60 (not shown in FIG. 4). These arms are connected to the actuator ring by two bolts 68.

In operation, when a pipe is to be coupled the hook arms are first moved into an open position by operation of the hydraulic cylinder 58. The cylinder causes the actuator ring 46 to rotate in an anti-clockwise direction, as viewed in FIG. 3, so that the rising cam portions 50 bear against the corresponding surfaces 69 of the hook arms 30 to cause those hook arms to pivot outwardly about their axes 32 to the fully open position. In the illustrated embodiment this is a pivoted movement through 24° (see FIG. 2). This moves the adaptor latches 34 outwardly and allows the flange 42 of a pipe 44 to be moved into a position adjacent the front flange 6. The actuator ring is then caused to rotate in the opposite direction, whereupon the hook arms 30 pivot into their closed position. This is achieved by the cam surfaces 70 of the hook arms. To reduce wear the surfaces 70 are provided with wear resistant material 71, for example Stellite. With continued rotation, the surfaces of the locking face blocks 54 begin to slide over the surfaces 70. As the hook arms reach their closed position the locking face blocks 54 progressively engage the corresponding surfaces 70 of the hook arms more and more firmly, and this frictional engagement between the locking face blocks and the surfaces 70 is sufficient to hold the hook arms in position even if there is no longer any force being supplied by the hydraulic cylinder 58.

To uncouple the coupled pipes the hydraulic cylinder is again actuated to cause the actuator ring to rotate anti-clockwise, the force applied by the hydraulic cylinder being sufficient to overcome the frictional force between the locking face blocks and the surfaces 70. Continued rotation of the actuator ring causes the hook arms to pivot into their open position.

Figure 10:
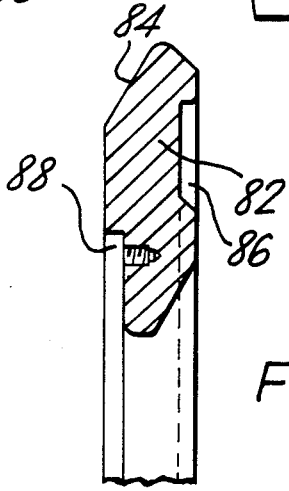
FIG. 10 is a section through an adaptor plate which is also shown in FIGS. 7 and 8.

The coupler described above can readily be adapted for use with pipes of various diameters. FIG. 6 shows the coupler configuration where the pipe being coupled has a coupling flange inches in diameter. This is also the configuration which is shown in FIGS. 1 and 2. If, however, it is desired to couple a pipe having a coupling flange of 10 inches diameter, the configuration of FIG. 7 can be employed. To convert from the configuration of FIG. 6 to the configuration of FIG. 7, three steps are necessary. The first step is to remove the adaptor latch 34 and to replace it with a longer adaptor latch 72 having a short arm provided with a protrusion 74 and a long arm provided with a protrusion 76. Both arms are provided with protrusions 38 corresponding to the protrusions 38 on the latch 34. The second step is to insert an adaptor plate 82. This plate is shown in more detail in FIG. 10. It will be seen that the outer forward edge of the plate 82 has a bevel 84. In the configuration of FIG. 7, the bevel 80 on the shorter wings 28 of the conical members 24 engages the bevel 84 of the plate 82. The adaptor plate 82 has a rearwardly directed annular groove 86 for receiving a sealing ring (not shown) and a forwardly directed recess 88 for receiving another sealing ring (not shown). The third step is to rotate the manifold guides 22 through 90° in a direction such that the sorter wings 28 are radially inward and the longer wings 26 are radially outward. The bevels 80 on the wings 28 are therefore forced into engagement with the bevel 84 on the plate 82 to hold the plate against the front flange 6. Coupling of a pipe 44 having a flange 42 of 10 inch diameter can then be achieved as described above with reference to FIG. 6 and it will be seen from FIG. 7 that the protrusions 74 on the short arms of the latches 72 will engage the flange 42 to couple the pipe 44.

FIG. 8 shows the coupler in a configuration in which it can couple a pipe which has a coupling flange 8 inches in diameter. This configuration is basically the same as that of FIG. 7, except that the manifold guides 22 have been rotated to 180° with respect to FIG. 7 so that the bevel 84 of the adaptor plate 82 is engaged by the bevels 78 on the longer wings 26 of the manifold guides. The adaptor latches 72 have been removed, turned through 180°, and then replaced so that their longer arms are located radially inwardly. Coupling of a pipe 44 is achieved in the same manner as above described except that, in this case, the pipe flange 42 is engaged by the protrusions 76 on the long arms of the latches 72.

When the coupler is not required for use it can be blanked off by a blanking plate 90, as shown in FIG. 9. This blanking plate has a bevelled outer edge which mates with the bevel 78 on the wings 26 of the manifold guides. The wings 26 then exert a force on the blanking plate sufficient to form a pressure-tight joint.

Figure 13:
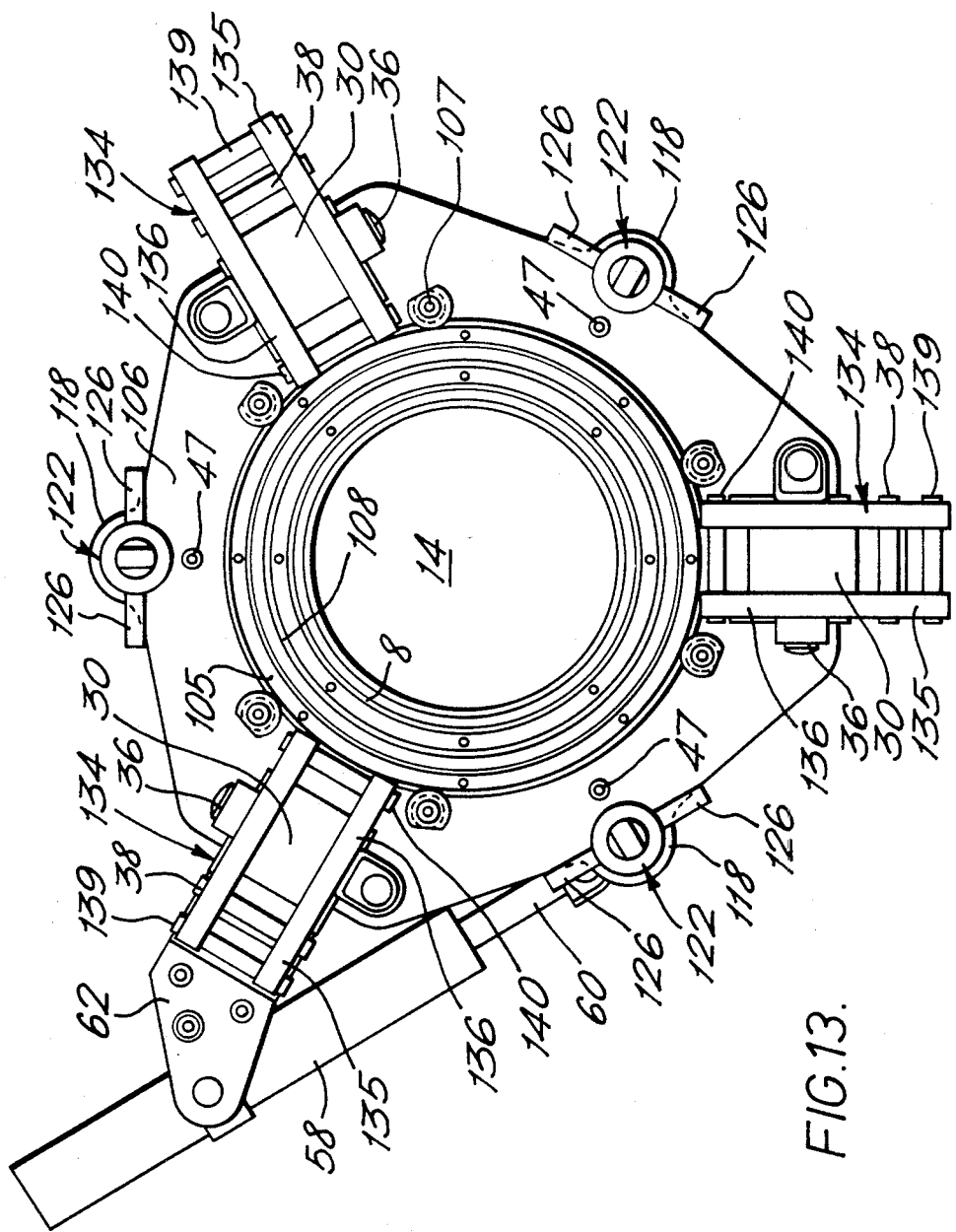
FIG. 13 is a front view of a second embodiment of a coupler according to the invention.
Figure 14:
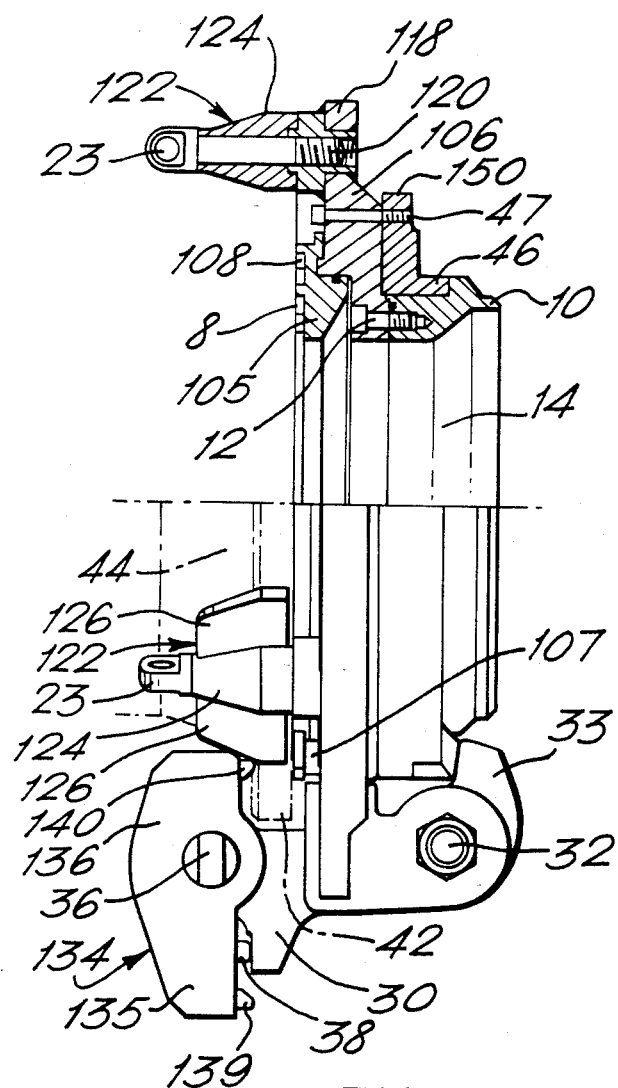
FIG. 14 is a side view of the coupler shown in FIG. 13.

FIGS. 13 and 14 show a modified form of coupler according to the invention which is adapted for coupling pipes having pipe flanges of 16 inches diameter as well as pipe flanges having diameters of 12 inches, 10 inches and 8 inches. In this embodiment, the front flange 106 is somewhat larger than the front flange 6 and a seal plate 105 is secured to the front face of the front flange 106 by a series of bolts 107. The head of each bolt is provided with a flattened region and the bolts are capable of being turned so that the flattened regions face radially inwardly. The seal plate 105 can then be offered up to the front flange 106 and held in position by turning the bolts 107 to the position shown in FIG. 13 so that the heads of said bolts engage the peripheral edge region of the seal plate 105. Said seal plate is provided with a circumferential groove in a tubular portion of the plate for the reception of an O-ring 109 to provide a seal between the front flange 106 and the seal plate.

The seal plate 105 is further provided with a radially inner face seal 8 and a radially outer face seal 108. The front flange 106 is secured to the cylindrical member 10 by socket screws 12 as in the previous embodiment.

Three tabs 118 extend from the periphery of the front flange 106 at locations spaced by 120° from each other. A manifold guide 122 is rotatably mounted by a respective pin 120 in a bore in each of the tabs 118 and each manifold guide comprises a generally conical member 124 from which two wings 126 extend radially in diametrically opposite directions. The wings 126 are of equal thickness and have substantially the same radial extent.

An actuator ring 46 is rotatably mounted on the cylindrical member 10 and is capable of being locked against rotation when the coupling is not in use by a number of slave bolts 47 which pass through bores in the front flange 106 and engage in screw-threaded bores in a cam section 150 of the actuator ring 46. As in the previous embodiment, the actuator ring 46 has cam surfaces which are engageable with hook arms 30 each of which carries an adaptor latch 134 pivotally mounted thereon by means of respective latch pins 36. The latches 134 are arranged to be actuated by the actuator ring 46 via the hook arms 30 in a similar manner to the previous embodiment.

FIGS. 13 and 14 show the coupler adapted for use in coupling a pipe with a pipe flange having a diameter of 16 inches. It will be seen that each adaptor latch 134 has a long arm 135 and a short arm 136 and in FIG. 14 the latches are arranged so that a protrusion 140 adjacent the end of the short arm 136 is arranged to bear on a pipe flange 42.

In order to convert the coupler to use for pipes having pipe flanges of 12 inches diameter, it is merely necessary to remove the adaptor latches 134, turn them through 180° and then refit them so that the longer arms 135 are located radially inwardly. Protrusions 139 adjacent the ends of the long arms 135 of the adaptor latches 134 are thereby arranged to bear on the pipe flange 42 of 12 inches diameter.

In both of the above-described configurations, the wings 126 of the manifold guides 122 are maintained in the position shown in FIGS. 13 and 14. In order to convert the coupler for use in coupling pipes having pipe flanges of 10 inches and 8 inches diameter, an adaptor plate (not shown) is fitted to the seal plate 105 and is held in place by rotating the manifold guides 122 through 90° so that the wings 126 engage the peripheral edge regions of the adaptor plate to hold the same in position. The procedure is similar to the conversion described above with reference to FIGS. 7 and 8 of the drawings. The adaptor latches 134 are also replaced by adaptor latches which are similar to the adaptor latches 72 shown in FIGS. 7 and 8 of the drawings and which, in one configuration, are adapted to engage a pipe flange having a diameter of 10 inches and, in the other configuration, are adapted to engage a pipe flange having a diameter of 8 inches.

A blanking plate (not shown) may be provided to blank off the coupler when it is not required for use in a similar manner to that described above with reference to FIG. 9. The actuator ring 46 can also be secured against rotation by means of the slave bolts 47 but these bolts must be removed before the coupler can be used.

Figure 15:
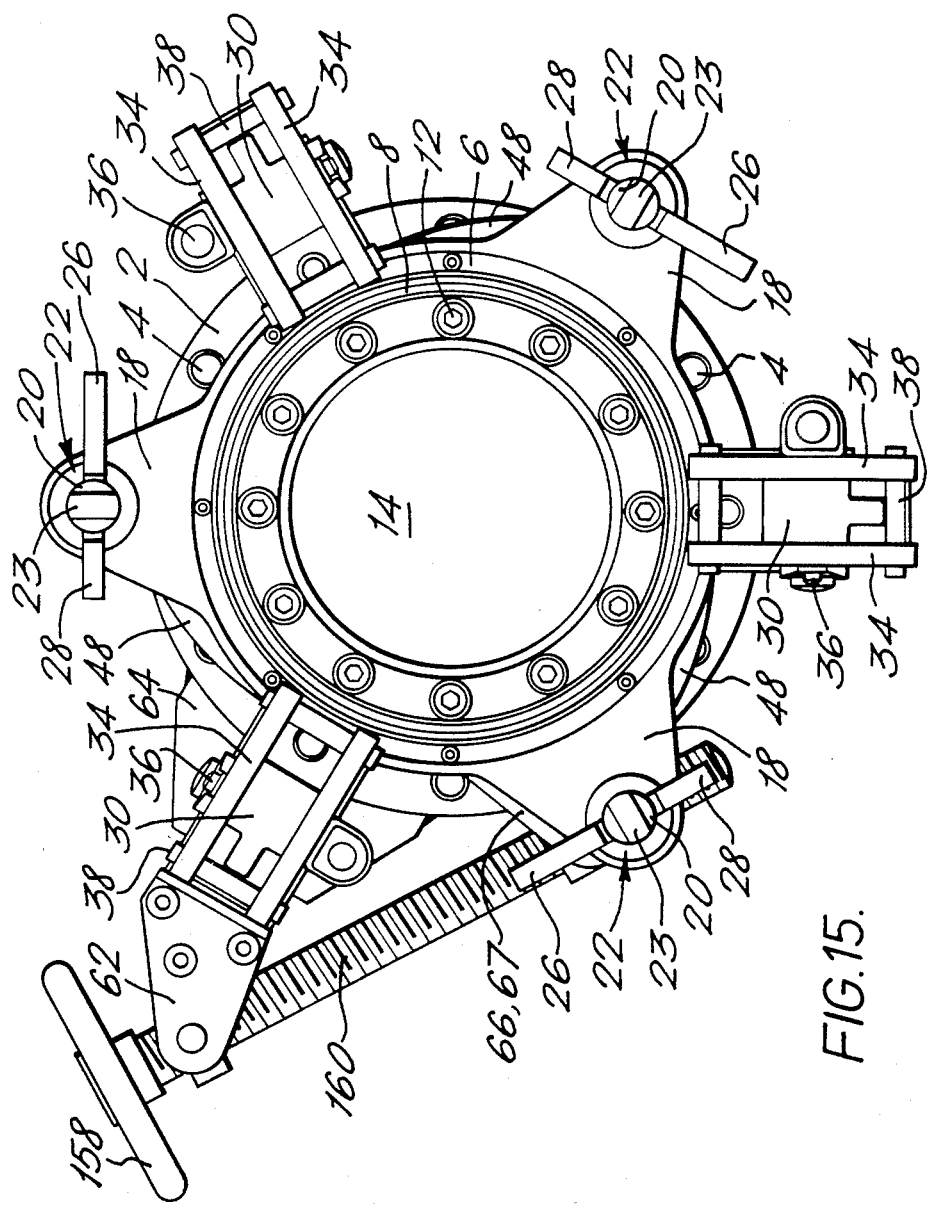
FIG. 15 is a front view of a further embodiment of a coupler according to the invention.

Finally, FIG. 15 shows a further modified embodiment in which the hydraulic cylinder 58 and piston rod 60 have been replaced by a screw 160 which is capable of manual operation by means of a hand wheel 158. This arrangement otherwise operates in exactly the same way as the embodiment shown in FIGS. 1 to 12 of the drawings. Similarly, the hydraulic cylinder 58 and piston rod 60 of the embodiment shown in FIGS. 13 and 14 of the drawings may be replaced by the screw 160 and hand wheel 158. Maual actuation of the coupler may be preferred for some applications particularly where it is difficult to achieve hydraulic actuation.

It will be seen that, in the pipe coupler according to the invention, there are very few moving parts and that only pivotal movement of the hook arms and adaptor latches takes place. The movement of the actuator ring is rotational and there is no axial movement of any of the components of the coupler according to the invention.

The coupler according to the invention can operate between high ambient and cryogenic temperatures and can be manufactured as an integral part of a valved rapid disconnect system, a valve or a proprietory pipe swivel unit. A mechanically locked, efficient leak-proof joint is provided. The simple construction and low weight enable the coupler according to the invention to be manufactured cheaply and easily and result in low capital expenditure and reduced operating costs as compared with the known pipe couplers.

The invention is not restricted to the above-described embodiments but modifications may be made without departing from the scope of the invention as defined by the appended claims.

I claim:

1. A coupler for coupling together two pipes, which comprises a plurality of pivotally mounted hook arms and an actuator ring which is capable of rotation to pivot the hook arms into and out of a pipe-coupling position, said coupler further comprising a substantially cylindrical body on which the hook arms and actuator ring are mounted, wherein the actuator ring is provided with a cam track arranged to cause the hook arms to pivot into and out of a position in which they serve to lock a flange at the end of a pipe to said substantially cylindrical body, and wherein the cam track and the hook arms are so configured that frictional forces therebetween are capable of locking the hook arms against vibration when used with varying thicknesses of flanges and without the provision of any other movable clamping means.

2. A coupler for coupling together two pipes, which comprises a plurality of pivotally mounted hook arms and an actuator ring which is capable of rotation to pivot the hook arms into and out of a pipe-coupling position, said coupler further comprisiing a substantially cylindrical body on which the hook arms and actuator ring are mounted and said actuator ring being provided with a cam track arranged to cause the hook arms to pivot into and out of a position in which they serve to lock a flange at the end of a pipe to said substantially cylindrical body, in which the cam track has a final part which is formed by a locking block having a surface across the cam track which has a clamping angle which provides a contact surface with the hook arms throughout the final pivoting movement thereof and hence serves to maintain a locking action on the hook arms as the actuator ring is rotated to the end of its travel.

3. A coupler as claimed in claim 2, in which said surface of the locking block is arranged to give the hook arms a positive lock over the last 10° of movement as the actuator ring is rotated.

4. A coupler as claimed in claim 2, in which three hook arms are provided spaced apart by approximately 120° on said body of the coupler.

5. A coupler as claimed in claim 2, in which the body is provided with a plurality of manifold guides for guiding a pipe flange into a coupling position.

6. A coupler as claimed in claim 5, in which an adaptor plate is provided which is adapted to be held to a front flange of the body by said manifold guides to permit the coupler to be used for coupling pipes of smaller diameter.

7. A coupler as claimed in claim 5, in which said manifold guides are provided with means for retaining a blanking plate on the coupler when said coupler is not required for use.

8. A coupler as claimed in claim 2, in which each hook arm carries an adaptor latch pivotally mounted thereon and engageable with a flange of a pipe to be coupled by the coupler.

9. A coupler as claimed in claim 2, in which the ring is arranged to be rotated by the action of a hydraulic cylinder and an associated piston rod connected to the actuator ring.

10. A coupler as claimed in claim 2, in which the ring is arranged to be rotated by manual operation of a screw operatively connected to the actuator ring.

* * * * *